(12) United States Patent
Takahashi et al.

(10) Patent No.: US 12,634,802 B2
(45) Date of Patent: May 19, 2026

(54) NETWORK DEVICE

(71) Applicant: NTT DOCOMO, INC., Tokyo (JP)

(72) Inventors: Hideaki Takahashi, Tokyo (JP);
Tianyang Min, Tokyo (JP)

(73) Assignee: NTT DOCOMO, INC., Tokyo (JP)

( * ) Notice: Subject to any disclaimer, the term of this
patent is extended or adjusted under 35
U.S.C. 154(b) by 314 days.

(21) Appl. No.: 17/761,836

(22) PCT Filed: Sep. 20, 2019

(86) PCT No.: PCT/JP2019/037103
§ 371 (c)(1),
(2) Date: Mar. 18, 2022

(87) PCT Pub. No.: WO2021/053828
PCT Pub. Date: Mar. 25, 2021

(65) Prior Publication Data
US 2022/0330135 A1 Oct. 13, 2022

(51) Int. Cl.
*H04W 48/08* (2009.01)
*H04W 48/06* (2009.01)
*H04W 76/18* (2018.01)
*H04W 88/06* (2009.01)

(52) U.S. Cl.
CPC ........... *H04W 48/06* (2013.01); *H04W 48/08*
(2013.01); *H04W 76/18* (2018.02); *H04W*
*88/06* (2013.01)

(58) Field of Classification Search
CPC ..... H04W 48/06; H04W 48/08; H04W 76/18;
H04W 88/06; H04W 48/02; H04W 48/12;
H04W 84/10
USPC ........................................................ 455/422.1
See application file for complete search history.

(56) References Cited

U.S. PATENT DOCUMENTS

| | | | | |
|---|---|---|---|---|
| 2017/0346826 A1* | 11/2017 | Morrill | .................... | H04L 63/10 |
| 2020/0389835 A1* | 12/2020 | Talebi Fard | .......... | H04W 48/04 |
| 2021/0297937 A1* | 9/2021 | Baek | ..................... | H04W 48/12 |

OTHER PUBLICATIONS

International Search Report issued in PCT/JP2019/037103 on Apr.
21, 2020 (1 page).

(Continued)

*Primary Examiner* — Huy C Ho
(74) *Attorney, Agent, or Firm* — Osha Bergman Watanabe
& Burton LLP

(57) ABSTRACT

A network transmits, toward a terminal, regulation informa-
tion that regulates access to the network by the terminal. The
network includes a first mobile communication network and
a second mobile communication network different from the
first mobile communication network, and transmits regula-
tion information in units of the second mobile communica-
tion network toward the terminal.

4 Claims, 5 Drawing Sheets

(56)         References Cited

OTHER PUBLICATIONS

Written Opinion of the International Searching Authority issued in PCT/JP2019/037103 on Apr. 21, 2020 (3 pages).

Huawei, HiSilicon; "Access control for SNPN and CAG on network sharing architecture"; 3GPP TSG-RAN2 Meeting #107, R2-1910556; Prague, Czech Republic; Aug. 26-30, 2019 (4 pages).

Intel Corporation; "Access Control for SNPN and CAG"; 3GPP TSG RAN WG2 Meeting #107, R2-1909403; Prague, Czech; Aug. 26-31, 2019 (3 pages).

China Telecom, Nokia, Vodafone; "Revised WID: Private Network Support for NG-RAN"; 3GPP TSG RAN Meeting #84, RP-191563; Newport Beach, USA; Jun. 3-6, 2019 (5 pages).

3GPP TS 22.261 V16.8.0; "3rd Generation Partnership Project; Technical Specification Group Services and System Aspects; Service requirements for the 5G system; Stage 1 (Release 16)"; Jun. 2019 (73 pages).

* cited by examiner

Figure 3:
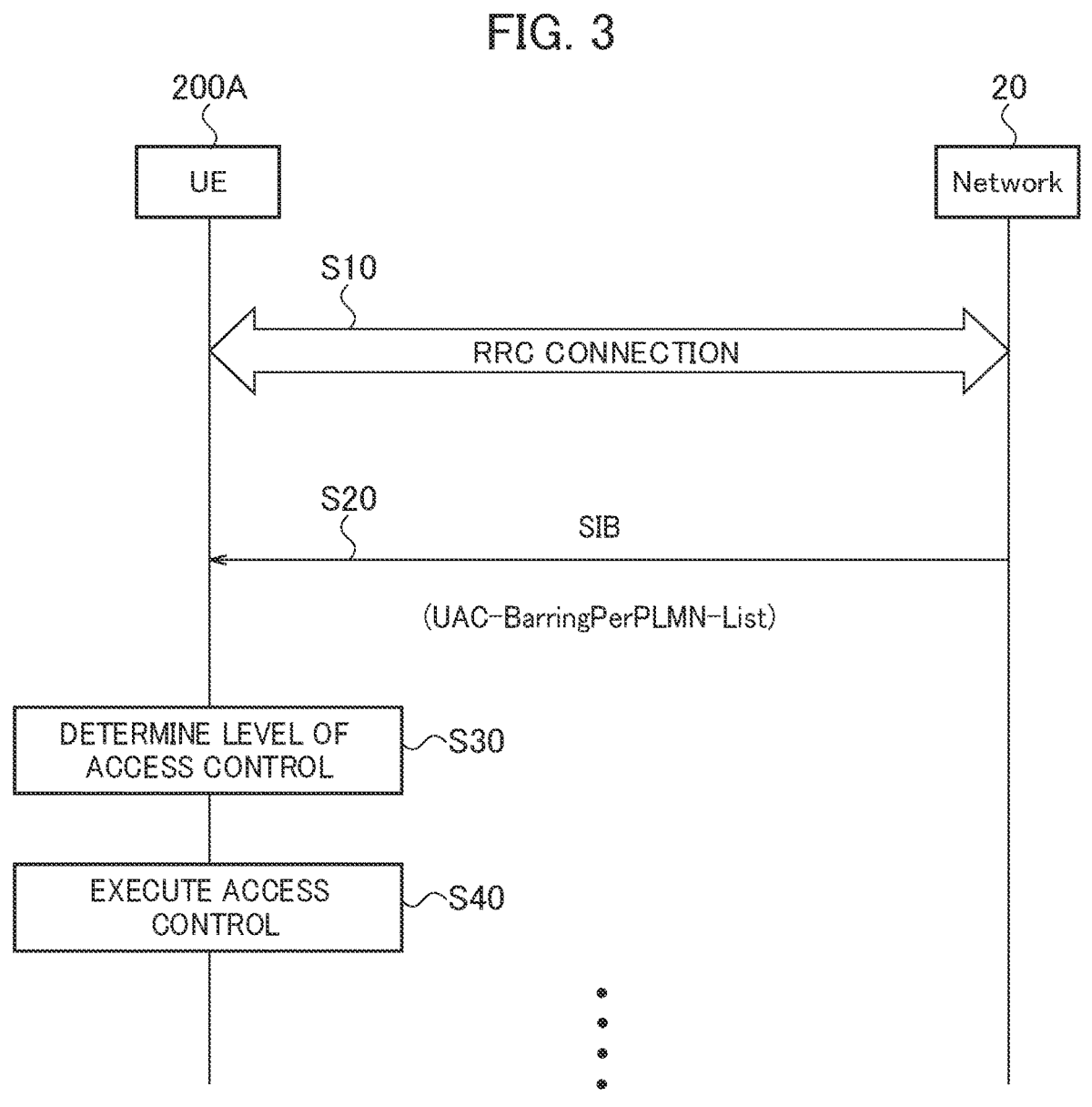

Network

S10

RRC CONNECTION

S20

SIB (UAC-BarringPerPLMN-List)

DETERMINE LEVEL OF
ACCESS CONTROL — S30

EXECUTE ACCESS
CONTROL — S40

FIG. 4

UAC-BarringPerPLMN-List information element

```
-- ASN1START
-- TAG-UAC-BARRINGPERPLMN-LIST-START

UAC-BarringPerPLMN-List ::=     SEQUENCE (SIZE (1.. maxPLMN)) OF UAC-BarringPerPLMN UAC-BarringPerPLMN ::=    SEQUENCE {
    plmn-IdentityIndex          INTEGER (1..maxPLMN),
    network-Identity            INTEGER (1..maxNPNID)
    uac-ACBarringListType       CHOICE{
        uac-ImplicitACBarringList       SEQUENCE (SIZE(maxAccessCat-1)) OF UAC-BarringInfoSetIndex,
        uac-ExplicitACBarringList       UAC-BarringPerCatList
    }                                                                               OPTIONAL     -- Need S
}

-- TAG-UAC-BARRINGPERPLMN-LIST-STOP
-- ASN1STOP
```

NETWORK DEVICE

TECHNICAL FIELD

The present invention relates to a network device that constitutes a mobile communication network.

BACKGROUND ART

The 3rd generation partnership project (3GPP) has specified long term evolution (LTE) and has also specified LTE-Advanced (hereinafter, referred to as LTE including LTE-Advanced) for the purpose of further speeding up LTE, and 5th generation mobile communication system (referred to as 5G, New Radio (NR) or Next Generation (NG)).

NR defines a technology for providing highly reliable and low latency communication (URLLC: Ultra-Reliable and Low Latency Communications).

In order to provide such URLLC more reliably, it is also considered to use a dedicated mobile communication network called non-public network (NPN) instead of the public mobile communication network (PLMN: Public Land Mobile Network) (Non Patent Literature 1).

Moreover, in the NR, it is also defined that terminals (user equipment, UE, hereinafter also referred to as NPN-UE) dedicated to the NPN can access PLMN services via the NPN or autonomously (Non Patent Literature 2).

CITATION LIST

Non Patent Literature

Non Patent Literature 1: "Private Network Support for NG-RAN", RP-191563, 3GPP TSG RAN Meeting #84, 3GPP, June 2019

Non Patent Literature 2: 3GPP TS 22.261 V16.8.0, 3rd Generation Partnership Project; Technical Specification Group Services and System Aspects; Service requirements for the 5G system; Stage 1 (Release 16), 3GPP, June 2019.

SUMMARY OF INVENTION

In a case where the access to a service of the PLMN of the above-mentioned NPN-UE is provided, the following states are assumed. Specifically, in a case where the NPN-UE cannot connect to the NPN due to a failure or the like of the NPN, the NPN-UE may request the connection with the PLMN.

On the other hand, the PLMN may intend to regulate access to the PLMN of the NPN-UE from the viewpoint of avoiding congestion and the like due to the connection of the NPN-UE to the PLMN.

However, in a case where a large number of NPN-UEs simultaneously access (connection request) the PLMN, the PLMN cannot efficiently regulate the access.

Therefore, the present invention has been made in view of such a situation, and an object thereof is to provide a network device capable of efficiently regulating access from terminals dedicated to the different mobile communication networks such as NPN-UE.

One aspect of the present disclosure is a network device (network node 30 or gNB 100A) including: a control unit (regulation content control unit 130) that regulates access to a network by a terminal (UE 200A); and a transmitting unit (regulation information transmitting unit 140) that transmits regulation information for regulating the access toward the terminal, in which the network includes a first mobile communication network (PLMN 20) and a second mobile communication network (NPN 40) different from the first mobile communication network, and the transmitting unit transmits the regulation information in units of the second mobile communication networks toward the terminal.

BRIEF DESCRIPTION OF DRAWINGS

FIG. 3 is a diagram illustrating an example of a communication sequence regarding access control with a terminal (UE 200A) and a network.

FIG. 4 is a diagram illustrating a configuration example of a UAC-BarringPerPLMN-List.

DESCRIPTION OF EMBODIMENTS

Figure 1:
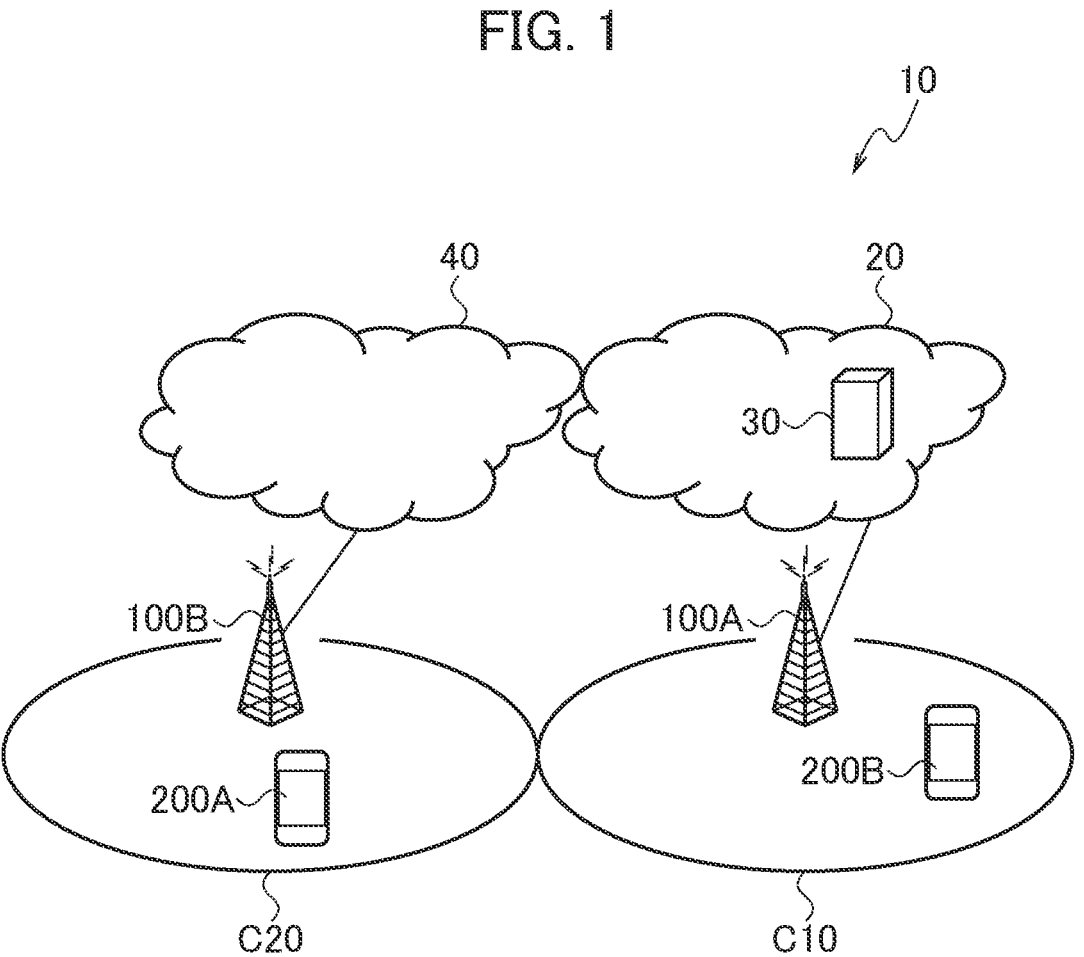
FIG. 1 is an overall schematic configuration diagram of a radio communication system 10.

Hereinafter, embodiments will be described with reference to the drawings. Note that the same functions and configurations are denoted by the same or similar reference numerals, and description thereof will be omitted as appropriate.

(1) Overall Schematic Configuration of Radio Communication System

FIG. 1 is an overall schematic configuration diagram of a radio communication system 10 according to the present embodiment. The radio communication system 10 is a radio communication system according to 5G New Radio (NR).

The radio communication system 10 may include a plurality of mobile communication networks. Specifically, the radio communication system 10 includes a Public Land Mobile Network 20 (hereinafter, referred to as a PLMN 20) and a Non-Public Network 40 (hereinafter, referred to as an NPN 40).

The PLMN 20 may be called a public mobile communication network, a mobile communication network, a public land mobile network, or the like, and the PLMN 20 includes a network node 30 and a radio base station 100A (hereinafter, referred to as a gNB 100A). Moreover, the PLMN 20 may be interpreted as an operator (telecommunications carrier) that provides a service using the PLMN 20.

The network node 30 is a network device that constitutes the PLMN 20. Specifically, the network node 30 may be interpreted as a communication node that realizes functions such as an Access and Mobility Management Function (AMF) and a Session Management Function (SMF).

The gNB 100A is a radio base station according to 5G (NR) and performs radio communication according to 5G with a user terminal 200A (User Equipment 200A, hereinafter, referred to as a UE 200A) and a user terminal 200B (User Equipment 200B, hereinafter, referred to as a UE 200B). The gNB 100A is also a network device that constitutes the PLMN 20, and the gNB 100A may realize a portion of the functions of the AMF or the SMF instead of the AMF or the SMF.

The NPN 40 may be called a non-public mobile communication network, a non-public network, a dedicated network, or the like, and the NPN 40 includes a radio base station 100B (hereinafter, referred to as a gNB 100B).

The NPN 40 may be intended for single use by private entities such as an enterprise and may be deployed in various configurations utilizing both virtual and physical elements. Specifically, the NPN 40 may be deployed as a completely stand-alone network (Stand-alone Non-Public Network (SNPN)), hosted by the PLMN 20, or provided as a slice of the PLMN 20. Note that the NPN may be called a Closed Access Group (CAG).

Note that, in the present embodiment, the PLMN 20 may constitute the first mobile communication network and the NPN 40 may constitute the second mobile communication network. That is, the network may include a first mobile communication network and a second mobile communication network different from the first mobile communication network. Moreover, the first mobile communication network may be interpreted as a public mobile communication network, and the second mobile communication network may be interpreted as a non-public mobile communication network.

That is, the radio communication system 10 (5G system) may support a Non-Public Network (NPN) and may support an NPN that provides coverage within a particular geographical area. The 5G systems can support both physical and virtual NPNs and can support stand-alone operation of the NPNs. On the other hand, the 5G system may provide access to subscribed PLMN services via the NPN or access to selected NPN services via the PLMN.

Moreover, the radio communication system 10 (5G system) supports a mechanism for the UE 200A dedicated to the NPN to identify and select the NPN.

In the present embodiment, the mobile communication network including the PLMN 20 and the NPN 40 different from the PLMN 20 may be simply expressed as a network. That is, the network may include the PLMN 20 and the NPN 40.

The gNB 100A constitutes the cell C10. The gNB 100B constitutes the cell C20. The UE 200B (PLMN-UE) dedicated to the PLMN resides in the cell C10 and can be connected to the gNB 100A. The UE 200A (NPN-UE) dedicated to the NPN can also access the subscribed PLMN service via the NPN, as described above.

Moreover, the UE 200A resides in the cell C20 and can be connected to the gNB 100B. Note that, in a case where the access to the selected NPN service via the PLMN is provided, the UE 200B can also access the NPN service.

The UE 200B dedicated to the PLMN may be understood as a terminal having a contract with an operator who provides a service using the PLMN 20. Moreover, the UE 200A dedicated to the NPN may not necessarily a terminal that has a contract with an operator that provides a service using the NPN 40, but the UE 200A may be understood as a terminal that is permitted to use the service using the NPN 40.

Note that the specific configuration of the radio communication system 10 including the numbers of the gNBs and the UEs is not limited to the example illustrated in FIG. 1. Moreover, the gNB and the UE can correspond to massive MIMO that generates a beam with higher directivity by controlling radio signals transmitted from a plurality of antenna elements, carrier aggregation (CA) using a plurality of component carriers (CC) bundled, dual connectivity (DC), and the like in which communication is performed simultaneously between the UE and each of the two NG-RAN Nodes.

(2) Functional Block Configuration of Radio Communication System

Next, a functional block configuration of the radio communication system 10 will be described. Specifically, the functional block configuration of the gNB 100A will be described.

Figure 2:
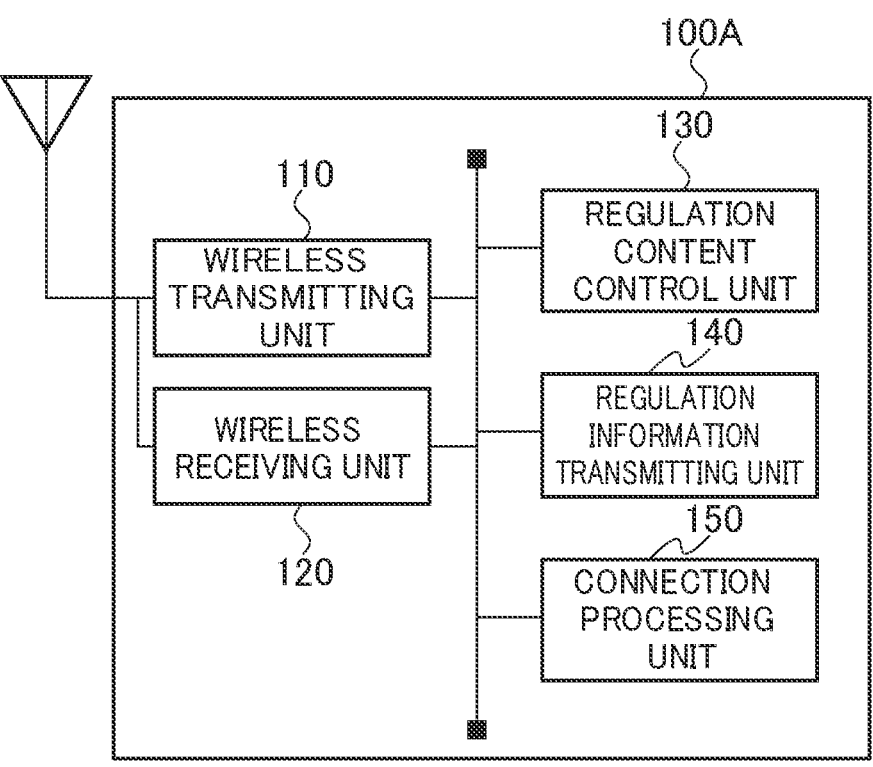
FIG. 2 is a functional block configuration diagram of gNB 100A.

FIG. 2 is a functional block configuration diagram of the gNB 100A. As illustrated in FIG. 2, the gNB 100A includes a radio transmitting unit 110, a radio receiving unit 120, a regulation content control unit 130, a regulation information transmitting unit 140, and a connection processing unit 150. In the present embodiment, the gNB 100A constitutes a network device.

The radio transmitting unit 110 transmits a radio signal according to the 5G specifications. In addition, the radio receiving unit 120 receives a radio signal according to the 5G specifications.

The regulation content control unit 130 controls the content of the access regulation applied to the network. Specifically, the regulation content control unit 130 regulates access to the network (PLMN 20) by the UE 200A (and UE 200B, hereinafter the same). In the present embodiment, the regulation content control unit 130 constitutes a control unit.

The regulation content control unit 130 executes access regulation according to the integrated access control (UAC) defined in 3GPP T524.501 and the like. Specifically, the regulation content control unit 130 acquires an access category to which the access regulation is applied, based on a plurality of access categories defined in the network.

The regulation content control unit 130 may acquire the access category to which the access regulation is applied from the network node 30 or may determine the access category to which the access regulation is applied by itself according to the load status of the gNB 100A. Moreover, the access category to which the access regulation is applied at the same time may be one or plural.

The regulation content control unit 130 causes the regulation information transmitting unit 140 to notify the cell C20 of the acquired access category. Specifically, the regulation content control unit 130 uses the system information, that is, the System Information Block (SIB) to notify the cell C20 of the regulation information including the acquired access category and the like.

The type of SIB used for the notification is not particularly limited, but typically the uac-BarringInfo included in SIB1 is used.

Moreover, the regulation content control unit 130 can also notify the regulation information in units of PLMN (per PLMN). Specifically, the regulation content control unit 130 uses UAC-BarringPerPLMN-List (see FIG. 4) that is an information element (IE) included in uac-BarringInfo.

Alternatively, in the present embodiment, the regulation content control unit 130 can include the NPN identification information in the UAC-BarringPerPLMN-List, that is, the information element (IE) that constitutes the regulation information in units of PLMN. Note that a specific configuration example of the UAC-BarringPerPLMN-List will be described later.

Moreover, the UAC-BarringPerPLMN-List may not be used for the notification (transmission) of the regulation information in NPN units (per NPN). For example, the regulation information may be defined as a new IE included in uac-BarringInfo, or by changing or adding the existing IE included in uac-BarringInfo, the regulation information in units of the NPN may be defined.

The regulation information transmitting unit 140 transmits regulation information for regulating access toward the terminal under the control of the regulation content control unit 130. In the present embodiment, the regulation information transmitting unit 140 constitutes a transmitting unit.

The regulation information transmitting unit 140 can transmit the regulation information in units of PLMN (per PLMN) toward the UE 200A. Specifically, the regulation information transmitting unit 140 transmits the SIB1 including the regulation information as described above.

Moreover, the regulation information transmitting unit 140 can transmit the regulation information in units of NPN (per NPN) toward the UE 200A. Specifically, the regulation information transmitting unit 140 can transmit the regulation information including the identification information of the NPN 40 toward the UE 200A, as described above.

Note that, with respect to the access regulation in units of the PLMN or NPN, that is, a mobile communication network, if the mobile communication network is identified by the identification information of the mobile communication network, actually, the access regulation may be applied to the entire mobile communication network, or the access regulation may be applied to a portion of the mobile communication network.

The connection processing unit 150 executes processing related to connection with the UE 200A. Specifically, the connection processing unit 150 executes processing related to the connection (RRC connection) in the RRC layer.

Moreover, the connection processing unit 150 sets a radio bearer (Signalling Radio Bearer (SRB), Data Radio Bearer (DRB)) via the channel set with the UE 200A. Alternatively, the regulation content control unit 130 performs transmission/reception of a protocol data unit (PDU) and a service data unit (SDU), specifically, assembly/disassembly of the PDU/SDU in a plurality of layers (a medium access control layer (MAC), a radio link control layer (RLC), and a packet data convergence protocol layer (PDCP) or the like.

The channels include a control channel and a data channel. The control channels include a physical downlink control channel (PDCCH), a physical uplink control channel (PUCCH), a physical random access channel (PRACH), a physical broadcast channel (PBCH), and the like.

Moreover, the data channel includes a physical downlink shared channel (PDSCH), a physical uplink shared channel (PUSCH), and the like.

Note that the reference signal includes a demodulation reference signal (DMRS), a sounding reference signal (SRS), a phase tracking reference signal (PTRS), and a channel state information-reference signal (CSI-RS), and the signal includes control signals and reference signals of the channel, RRC layer, and the like. Moreover, the data may denote data transmitted via the data channel.

(3) Operation of Radio Communication System

Next, the operations of the radio communication system 10 will be described. Specifically, next, the operations of the radio communication system 10 will be described. Specifically, the application of the access regulation in the network and the operations relating to the access control of the terminal based on the access regulation will be described.

(3.1) Outline of Operations

First, an outline of the target operations in this embodiment will be described. In a case where the NPN-UE (UE 200A) cannot connect to the NPN 40 due to a failure of the NPN 40 or the like, if a large number of NPN-UEs simultaneously access the PLMN (connection request), the PLMN-UE (UE 200B) may be adversely affected.

In particular, the NPN-UE is highly likely to be used to provide URLLC, has a high required quality of service (QoS), and has a strong tendency to increase required radio resources. For this reason, if the success of the NPN-UE is allowed unlimitedly without regulation, the PLMN-UE may have a disadvantage that it is difficult to start the random access procedure using the RACH.

Note that URLLC (ultra-reliability, low-latency communication) is positioned as a category that requires support for very low latency and very high availability of communication services. This may denote very high reliability. The overall service delay depends on the delay of the air interface, the transmission within the 5G system, the transmission to the server outside the 5G system, the data processing, and the like.

As scenarios that require support for such very low latency and very high availability of communication services, motion control, discrete automation, process automation, power distribution automation, intelligent transportation systems, remote control, rail communications, AR (Augmented Reality)/VR (Virtual Reality), and the like may be exemplified.

In addition, the name of the URLLC may not necessarily be URLLC, and if the name indicates high-reliability or low-latency communication, for example, URLLC service (low latency service), industrial IoT (IIOT) service, high security, High reliability service, high QoS service, or the like may be used as the name. That is, as long as a name indicates a high degree of demanding at various service levels such as speed (delay), radio quality, and error resistance, any name may be used.

In particular, in the existing UAC mechanism, the access regulation in units of the PLMN may be activated, but the access regulation in units of the NPN may not be activated.

Therefore, in the present embodiment, while following the UAC mechanism, the access regulation in units of the NPN is realized, and the access to the network (PLMN 20) of the NPN-UE is effectively regulated, so that the adverse effect on the PLMN-UE is suppressed.

Specifically, by adding a new field called network-Identity to the UAC-BarringPerPLMN-List included in the SIB1, access regulation in units of the NPN is realized.

(3.2) Detailed Operations

FIG. 3 illustrates an example of a communication sequence relating to the access control between the terminal (UE 200A) and the network.

As illustrated in FIG. 3, the UE 200A (NPN-UE) is a network that establishes (herein, transition (cell reselection) from the NPN 40 to the PLMN 20 is assumed), specifically, an RRC connection with the PLMN 20 (S10). In addition, the setting of the SRB, the DRB, and the like (not illustrated in FIG. 4) are executed, and the UE 200A starts communication via the network.

The network (PLMN 20) can activate the access regulation according to the congestion status of the network. Herein, the network sets the NPN 40 as a target, that is, activates the access regulation in units of the NPN (per NPN). Therefore, it is possible to efficiently realize access regulation for all UEs (NPN-UE) dedicated to the NPN 40.

The network (PLMN 20) transmits the SIB1 including the UAC-BarringPerPLMN-List (S20). FIG. 4 illustrates a configuration example of the UAC-BarringPerPLMN-List. As illustrated in FIG. 4, the UAC-BarringPerPLMN-List includes fields of the UAC-BarringPerPLMN. UAC-BarringPerPLMN-List, which is a type of information element (IE), provides access control parameters specific to the access category set for each mobile communication network.

The subordinates of the UAC-BarringPerPLMN field include a network-Identity field (see underlined portion). The network-Identity is represented by an integer, and the integer corresponds to the identification information of the mobile communication network (PLMN or NPN).

The network-Identity is not an integer, and may be a name, an abbreviation, or the like of the mobile communication network as long as the mobile communication network can be identified.

Note that the network may use the existing UAC mechanism to set the NPN 40 as a target of an access regulation by the access regulation in units of the PLMN (per PLMN) similarly to the PLMN. However, since the network-Identity as described above is not included, in a case where there is a plurality of mobile communication networks such as the PLMN 20 and the NPN 40, it is difficult to flexibly execute the access regulation like the unit of the mobile communication network.

The UE 200A determines the access control level based on the content of uac-BarringInfo included in the received SIB1 (S30). Herein, the UE 200A determines that the access regulation for the NPN 40 is activated based on the value of the network-Identity.

The UE 200A executes the access control to the network, specifically the prohibition of the access, the limitation of the number of times, or the like on the basis of the activation of the access regulation (S40).

(4) Function and Effect

According to the above-described embodiment, the following functions and effects can be obtained. Specifically, the gNB 100A can transmit the regulation information (UAC-BarringPerPLMN-List) in units of the mobile communication network, specifically, the NPN 40 toward the UE 200A (and UE 200B, hereinafter the same).

That is, in the radio communication system 10, access from terminals for different mobile communication networks such as NPN-UE can be efficiently regulated.

In the present embodiment, in particular, the access regulation using NPN 40 as a unit can be applied. For this reason, even in a case where the access to the service of the PLMN of the NPN-UE is provided, the access regulation to all UEs dedicated to the NPN 40 (NPN-UE) can be realized efficiently by applying the access regulation in units of the mobile communication network.

In the present embodiment, the UAC-BarringPerPLMN-List, that is, the information element (IE) constituting the regulation information in units of PLMN can include the NPN identification information (network-Identity). For this reason, it is possible to easily realize access regulation in units of NPN while following the existing UA mechanism.

(5) Other Embodiments

Heretofore, although the contents of the present invention have been described with reference to the embodiments, it is obvious to those skilled in the art that the present invention is not limited to these descriptions and various modifications and improvements can be made.

For example, although an example in which the gNB 100A constitutes a network device has been described in the above-described embodiment, in the function related to the access regulation of the gNB 100A, the network node 30 that realizes the AMF or the like may constitutes the network device.

Moreover, although the access regulation for the NPN-UE that can access the PLMN 20 and the NPN 40 has been described in the above-described embodiment, a combination of the PLMN and the NPN may not necessarily be used, the access regulation in units of a mobile communication network as described above may be applied to the UE that can access a plurality of different PLMNs or a plurality of different NPNs.

Moreover, the block diagram used for explaining the embodiments (FIG. 2) illustrates blocks of functional unit. Those functional blocks (structural components) can be realized by a desired combination of at least one of hardware and software. Methods for realizing each functional block is not particularly limited. That is, each functional block may be realized by one device combined physically or logically. Alternatively, two or more devices separated physically or logically may be directly or indirectly connected (for example, wired, or radio) to each other, and each functional block may be realized by these plural devices. The functional blocks may be realized by combining software with the one device or the plural devices mentioned above.

Functions include determining, deciding, judging, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) that causes transmitting may be called a transmitting unit or a transmitter. For any of the above, as explained above, the realization method is not particularly limited to any one method.

Figure 5:
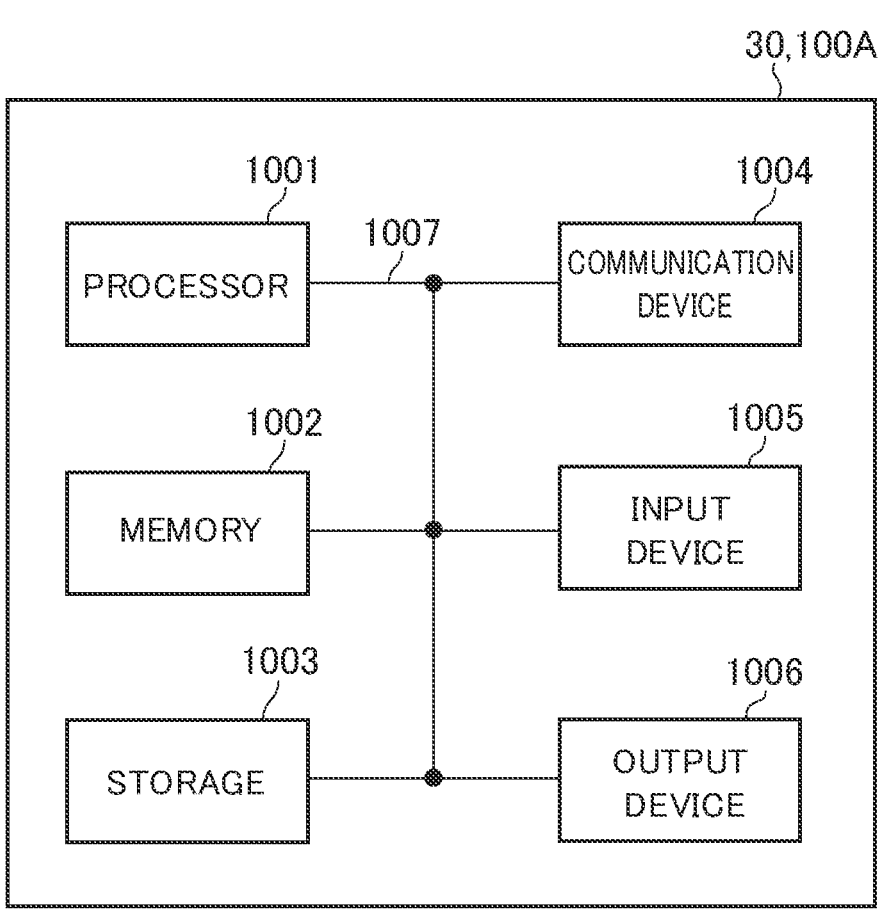
FIG. 5 is a diagram illustrating an example of a hardware configuration of the network node 30 and the gNB 100A.

Furthermore, the network node 30 and the gNB 100A (the device) explained above can function as a computer that performs the processing of the radio communication method of the present disclosure. FIG. 5 is a diagram illustrating an example of a hardware configuration of the device. As illustrated in FIG. 5, the device can be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices illustrated in the figure, or can be constituted by without including a part of the devices.

The functional blocks (see FIG. 2) of the device can be realized by any of hardware elements of the computer device or a desired combination of the hardware elements.

Moreover, the processor 1001 performs computing by loading a predetermined software (computer program) on hardware such as the processor 1001 and the memory 1002, and realizes various functions of the device by controlling communication via the communication device 1004, and controlling reading and/or writing of data on the memory 1002 and the storage 1003.

The processor 1001, for example, operates an operating system to control the entire computer. The processor 1001 can be configured with a central processing unit (CPU) including an interface with a peripheral device, a control device, a computing device, a register, and the like.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EE-PROM), Random Access Memory (RAM), and the like. The memory 1002 can be called register, cache, main memory (main storage memory), and the like. The memory 1002 can store therein a computer program (computer program codes), software modules, and the like that can execute the method according to the embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or radio network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information thereamong. The bus 1007 can be constituted by a single bus or can be constituted by separate buses between the devices.

Further, the device is configured to include hardware such as a microprocessor, a digital signal processor (DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Notification of information is not limited to that explained in the above aspect/embodiment, and may be performed by using a different method. For example, the notification of information may be performed by physical layer signaling (for example, Downlink Control Information (DCI), Uplink Control Information (UCI), upper layer signaling (for example, RRC signaling, Medium Access Control (MAC) signaling, notification information (Master Information Block (MIB), System Information Block (SIB)), other signals, or a combination of these. The RRC signaling may be called RRC message, for example, or can be RRC Connection Setup message, RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods explained above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information and signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, computer program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a radio technology (infrared light, microwave, or the like), then at least one of these wired and radio technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of a channel and a symbol may be a signal (signaling). Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same). For example, each of the aspects/embodiments of the present disclosure may be applied to a configuration that allows a communication between a base station and a mobile station to be replaced with a communication between a plurality of mobile stations (for example, may be referred to as Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms an uplink channel, a downlink channel, or the like may be read as a side channel.

Likewise, a mobile station in the present disclosure may be read as a base station. In this case, the base station may have the function of the mobile station.

A radio frame may be configured with one or more of frames in the time domain. Each of one or more of frames in the time domain may be referred to as a subframe.

A subframe may also be configured with one or more slots in the time domain. The subframe may have a fixed time length (for example, 1 ms) that does not depend on numerology.

The numerology may be a communication parameter applied to transmission and/or reception of a signal or channel. Numerology may indicate, for example, at least one of subcarrier spacing (SCS), a bandwidth, a symbol length, a cyclic prefix length, a transmission time interval (TTI), the number of symbols per TTI, a radio frame configuration, a specific filtering processing performed by a transreceiver e in the frequency domain and a specific windowing processing performed by a transceiver in the time domain.

A slot may be configured with one or more symbols (Orthogonal Frequency Division Multiplexing (OFDM) symbols, Single Carrier Frequency Division Multiple Access (SC-FDMA) symbols, or the like) in the time domain. A slot may be a time unit based on the numerology.

The slot may include a plurality of minislots. Each minislot may be configured with one or more symbols in the time domain. In addition, the minislot may also be called a subslot. The minislots may be configured with fewer symbols than the slots. The PDSCH (or PUSCH) transmitted in a time unit larger than the minislot may be referred to as a PDSCH (or PUSCH) mapping type A. The PDSCH (or PUSCH) transmitted using the minislot may be referred to as PDSCH (or PUSCH) mapping type B.

The radio frame, the subframe, the slot, the minislot, and the symbol all represent a time unit for transmitting a signal. The radio frame, the subframe, the slot, the minislot, and the symbol may be referred to as different names corresponding to thereof.

For example, one subframe may be referred to as a transmission time interval (TTI), a plurality of consecutive subframes may be referred to as TTI, and one slot or one minislot may be referred to as TTI. That is, at least one of the subframe and the TTI may be a subframe (1 ms) in an existing LTE, may be a period shorter than 1 ms (for example, 1-13 symbols), and may be a period longer than 1 ms. Note that the unit representing the TTI may be called a slot, a minislot, or the like instead of a subframe.

Herein, the TTI denotes, for example, the minimum time unit of scheduling in radio communication. For example, in the LTE system, the base station performs scheduling to allocate radio resources (frequency band width that can be used in each user terminal, transmission power, or the like) to each user terminal in units of a TTI. Note that the definition of TTI is not limited to this.

The TTI may be a transmission time unit such as a channel-coded data packet (transport block), a code block, and a codeword and may be a processing unit such as scheduling or link adaptation. Note that, when a TTI is given, the time interval (for example, the number of symbols) in which a transport block, a code block, a code word, and the like are actually mapped may be shorter than the TTI.

Note that, when one slot or one minislot is called a TTI, one or more TTIs (that is, one or more slots or one or more minislots) may be the minimum time unit of scheduling. Also, the number of slots (the number of minislots) constituting the minimum time unit of the scheduling may be controlled.

The TTI having a time length of 1 ms may be referred to as a general TTI (TTI in LTE Rel. 8-12), a normal TTI, a long TTI, a general subframe, a normal subframe, a long subframe, a slot, or the like. The TTI shorter than the general TTI may be referred to as a shortened TTI, a short TTI, a partial TTI (partial or fractional TTI), a shortened subframe, a short subframe, a minislot, a subslot, a slot, or the like.

Note that a long TTI (for example, a general TTI, a subframe, or the like) may be read as a TTI having a time length of more than 1 ms, and a short TTI (for example, a shortened TTI) may be read as a TTI having a TTI length less than the TTI length of a long TTI and 1 ms or more.

The resource block (RB) is a resource allocation unit in the time domain and the frequency domain, and the resource block may include one or a plurality of continuous subcarriers in the frequency domain. The number of subcarriers included in the RB may be the same regardless of the numerology and may be, for example, 12. The number of subcarriers included in the RB may be decided based on the numerology.

Also, the time domain of the RB may include one or more symbols and may be one slot, one minislot, one subframe, or one TTI in length. One TTI, one subframe, or the like may be configured with one or more of the resource blocks.

Note that one or more RBs may be referred to as physical resource blocks (Physical RB: PRB), sub-carrier groups (SCG), resource element groups (REG), PRB pairs, RB pairs, or the like.

Moreover, the resource block may be configured with one or more resource elements (RE). For example, 1 RE may be a radio resource region of 1 subcarrier and 1 symbol.

A bandwidth part (BWP) (may be referred to as partial bandwidth) may be a subset of continuous common RBs (common resource blocks) for a certain numerology in a certain carrier. Herein, the common RBs may be specified by the index of the RBs based on the common reference points of the carrier. The PRBs may be defined in a BWP and numbered within the BWP.

The BWP may include a BWP (UL BWP) for the UL and a BWP (DL BWP) for the DL. For the UE, one or more BWPs may be set in one carrier.

At least one of the set BWPs may be activated, and the UE may not be assumed to transmit or receive any predetermined signal/channel outside the activated BWP. Note that the "cell", the "carrier", and the like in the present disclosure may be read as the "BWP".

The structures of the radio frame, the subframe, the slot, the minislot, the symbol, and the like described above are merely examples. For example, the configuration such as the number of subframes included in a radio frame, the number of slots per subframe or radio frame, the number of minislots included in a slot, the number of symbols and RBs included in a slot or a minislot, the number of subcarriers included in an RB, the number of symbols in a TTI, the symbol length, and the cyclic prefix (CP) length can be variously changed.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the radio frequency domain, the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each of the above-mentioned devices may be replaced with "unit", "circuit", "device", and the like.

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as "a", "an", and "the" in English are added, in this disclosure, these articles shall include plurality of nouns following these articles.

The terms "determining" and "deciding" used in present disclosure may include a wide variety of operations. The terms "determining" and "deciding" may include, for example, considering judging, calculating, computing, processing, deriving, investigating, searching (looking up, search, inquiry) (for example, searching in a table, a database, or another data structure), ascertaining as "determining", "deciding", and the like. Moreover, the terms "determining" and "deciding" may include considering receiving (for example, receiving information), transmitting (for example, transmitting information), input, output, and accessing (for example, accessing data in a memory) as "determining", "deciding", and the like. In addition, the terms "determining" and "deciding" may include considering resolving, selecting, choosing, establishing, comparing, and the like as "determining" and "deciding". That is, the terms "determining" and "deciding" may include considering some operation as "determining" and "deciding". In addition, "determining (deciding)" may be read as "assuming", "expecting", "considering", and the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

REFERENCE SIGNS LIST

10 RADIO COMMUNICATION SYSTEM
20 PLMN
30 NETWORK NODE
40 NPN
100A, 100B gNB
110 RADIO TRANSMITTING UNIT
120 RADIO RECEIVING UNIT
130 REGULATION CONTENT CONTROL UNIT
140 REGULATION INFORMATION TRANSMITTING UNIT
150 CONNECTION PROCESSING UNIT
200A, 200B UE
1001 PROCESSOR
1002 MEMORY
1003 STORAGE
1004 COMMUNICATION DEVICE

1005 INPUT DEVICE
1006 OUTPUT DEVICE
1007 BUS

The invention claimed is:

1. A network device comprising:
a processor that regulates access to a public mobile communication network by a terminal for one or more non-public mobile communication networks; and
a transmitter that transmits regulation information for regulating the access toward the terminal,
wherein the regulation information includes a list of identification information per the one or more non-public mobile communication networks,
wherein the list of identification information includes one or more indices indicating the one or more non-public mobile communication networks, and
wherein the regulation information includes the list of identification information of the non-public mobile communication network and a corresponding access-barring list that is an implicit barring list or an explicit barring list.

2. The network device according to claim 1,
wherein the processor regulates the access when the terminal is provided with an industrial Internet of Things service.

3. A radio communication method performed by a network device comprising:
regulating access to a public mobile communication network by a terminal for one or more non-public mobile communication networks; and
transmitting regulation information for regulating the access toward the terminal,
wherein the regulation information includes a list of identification information per the one or more non-public mobile communication networks,
wherein the list of identification information includes one or more indices indicating the one or more non-public mobile communication networks, and
wherein the regulation information includes the list of identification information of the non-public mobile communication network and a corresponding access-barring list that is an implicit barring list or an explicit barring list.

4. A radio communication system comprising:
a terminal for one or more non-public mobile communication networks; and
a network device, wherein the network device comprises:
a processor that regulates access to a public mobile communication network by the terminal; and
a transmitter that transmits regulation information for regulating the access toward the terminal,
wherein the regulation information includes a list of identification information per the one or more non-public mobile communication networks,
wherein the list of identification information includes one or more indices indicating the one or more non-public mobile communication networks, and
wherein the regulation information includes the list of identification information of the non-public mobile communication network and a corresponding access-barring list that is an implicit barring list or an explicit barring list.

* * * * *